United States Patent Office 3,657,449
Patented Apr. 18, 1972

3,657,449
CONTROL OF VIRUS DISEASES OF PLANTS WITH CARBOXAMIDO OXATHIINS
Robert A. Davis, Cheshire, and Robert E. Grahame, Waterbury, Conn., and Marshall Kulka, Guelph, Wellington, Canada, assignors to Uniroyal, Inc., New York, N.Y., and Uniroyal Ltd., Montreal, Quebec, Canada
No Drawing. Filed Mar. 9, 1970, Ser. No. 17,945
Int. Cl. A01n 9/12
U.S. Cl. 424—276  7 Claims

ABSTRACT OF THE DISCLOSURE

Plant diseases caused by virus, such as tobacco ringspot and southern bean mosaic, are controlled by application of 5,6-dihydro-2-methyl-1,4-oxathiin-3-carboxamides (also called 2,3-dihydro-5-carboxamido-6-methyl-1,4-oxathiins) of the formula

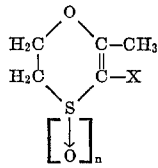

wherein X is a carboxamide (usually N-substituted) group and n is zero, 1 or 2. Examples of the chemicals are 5,6-dihydro-2-methyl-N-(2-biphenylyl)-1,4-oxathiin-3-carboxamide, 5,6-dihydro-2-methyl-N-(m-tolyl)-1,4-oxathiin-3-carboxamide-4,4-dioxide, and 5,6-dihydro-2-methyl-N-(2,6-dimethylphenyl)-1,4-oxathiin-3-carboxamide.

BACKGROUND OF THE INVENTION

(1) Field of the invention

This invention relates to a method of controlling plant diseases caused by virus.

(2) Description of the prior art

The chemicals employed in the present invention are known chemicals. Thus, the 5,6-dihydro-2-methyl-1,4-oxathiin-3-carboxamides (also called 2,3-dihydro-5-carboxamido-6-methyl-1,4-oxathiins) are described in U.S. Pat. 3,393,202, Kulka et al., July 16, 1968, and the sulfoxides and sulfones thereof are described in U.S. Pat. 3,399,214, Kulka et al., Aug. 27, 1968.

Use of the foregoing oxathiins for control of bacteria and fungus diseases of plants and other loci is disclosed in U.S. Pats. 3,249,499, von Schmeling et al., May 3, 1966 and 3,402,241, von Schmeling et al., Sept. 17, 1968.

Virus diseases of plants are of course distinct from fungus and bacterial diseases of plants, and conventional agricultural chemicals known to be effective against virus diseases.

Survey of the report of the U.S.D.A. Agricultural Research Service on "Losses in Agriculture" (Agr. Handbook No. 291, 1965) reveals the importance of plant virus disease control. Losses in the major food crops such as wheat, corn, fruits and vegetables in the present state of the art are common and significant.

Control of plant virus diseases has depended to a great extent on use of plant varieties which are resistant to particular virus diseases. Resistance is both difficult to achieve and to maintain. Other methods such as certain cultural practices, use of disease free plant propagation and control of insect vectors which spread plant virus diseases are partial solutions in many cases. However, there are several virus diseases for which ordinary control methods are inadequate.

Control of virus diseases with chemicals has not been explored extensively by researchers since experience has shown that a chemical must be taken into the plant if it is to have an effect on the virus. Most chemicals investigated for this purpose have not been of the systemic type and therefore have not been very successful.

SUMMARY OF THE INVENTION

The invention is based on the surprising discovery that virus diseases of plants can be controlled by the action of a 5,6-dihydro-2-methyl-1,4-oxathiin-3-carboxamide of the formula

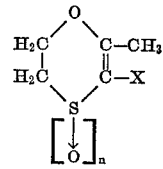

wherein X is a carboxamide group (which may be N-substituted) and n is zero, 1 or 2.

In accordance with the invention, virus diseases of plants can be controlled in a highly effective manner by applying to plant life, that is, to plants or seeds (either directly and/or to the soil in which the plant life is grown), a small but effective amount of 5,6-dihydro-2-methyl-1,4-oxathiin-3-carboxamide of the formula stated above, especially one in which there is at least one substituent other than hydrogen on the nitrogen atom of the carboxamido group, typified by 5,6-dihydro-2-methyl-N-(2-biphenylyl)-1,4-oxathiin-3-carboxamide:

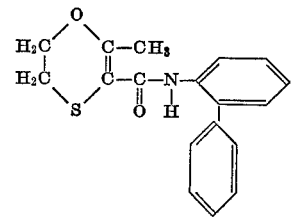

Other preferred chemicals are 5,6-dihydro-2-methyl-N-(m-tolyl)-1,4-oxathiin-3-carboxamide-4,4-dioxide, and 5,6-dihydro-2-methyl-N-(2,6-dimethylphenyl)-1,4-oxathiin-3-carboxamide.

The present virus control agents may be used on various kinds of plant life including vegetables such as tomato, cucumber, lettuce, squash, celery, pepper, peas, beans, onions, carrots, cauliflower, cabbage, beets, etc. on field crops such as potatoes, corn, beans, sugar beets, tobacco, wheat or other grains, and forage crops such as alfalfa. They may also be used for control of virus diseases of fruit such as may occur on peaches, apples or cherries.

The activity of the present virus control agents is noted particularly in connection with mosaic type viruses which include southern bean mosaic virus, common bean mosaic virus, pea mosaic virus, tobacco mosaic virus, cucurbit mosaic virus, maize mosaic virus, lettuce mosaic virus, wheat mosaic virus, sugar beet mosaic virus, alfalfa mosaic virus, beet mosaic virus, peach mosaic virus, etc. The activity against viruses of the ringspot types such as tobacco ringspot virus and tomato ringspot virus has also been demonstrated.

Control of virus disease is, of course, distinct from control of fungus or bacterial disease, as evidenced by the fact that the present chemicals are effective in virus control in the absence of fungus or bacterial disease.

The chemical may be applied to seeds by tumbling the chemical with the seed, either along or in admixture with a powdered solid carrier, to coat the seeds. Typical powdered solid carriers are the various mineral silicates, e.g. mica, talc, pyrophillite, and clays. The chemical may also be applied to the seeds in admixture with a conventional surface-active wetting agent, with or without additional powdered solid carrier, as by first wetting the mixture with a small amount of water and then tumbling the seeds in the slurry. The surface-active wetting agents that may be used with the chemical may be any of the conventional anionic, nonionic, or cationic surface-active agents. Such surface-active agents are well known and reference is made to U.S. Pat. No. 2,547,724, columns 3 and 4 for detailed examples of the same. As a seed treatment, the amount of the chemical coated on the seeds will be 2 to 8 ounces per hundred pounds of the seed. As a soil treatment the chemical may be applied as a dust in admixture with sand or soil or a powdered solid carrier such as a mineral silicate, with or without an additional surface-active wetting agent, to the furrows with the planting of the seeds, or the chemical may be applied as an aqueous spray, if desired including a surface-active dispersing agent, or a surface-active dispersing agent and a powdered solid carrier, to the seed rows before, or with, or after planting the seeds. As a soil treatment, the amount of the chemical applied to the seed rows will be from 0.1 to 10 pounds per acre based on parallel rows 2" wide, 2" deep, and a distance of 40" apart. Also, as a soil treatment, the chemical may be applied broadcast as a similar dust or aqueous spray with an application rate of 1 to 10 pounds per acre. As a foliage treatment, the chemical may be applied to growing plants at a rate of 0.5 to 5.0 pounds per acre. Such application is generally as an aqueous spray which also contains a surface-active dispersing agent, or a surface-active dispersing agent and a powdered solid carrier.

DESCRIPTION OF THE PREFERRED EMBODIMENTS

The 5,6-dihydro-2-methyl-1,4-oxathiin-3-carboxamides that may be employed in the invention are any of oxathiins or sulfones or sulfoxides thereof disclosed in the above-mentioned U.S. Pats. 3,249,499; 3,393,202; 3,399,214; and 3,402,241, the disclosures of which are hereby incorporated herein by reference to avoid repetition. Some examples of chemicals within the scope of the invention are:

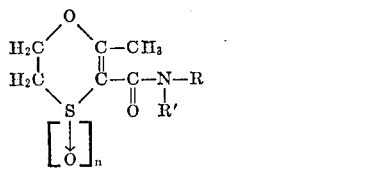

Value of n                           Value of R (R'=H)

(I) Where R is an aryl group phenyl, biphenyl, or naphthyl:

| n= | R= |
|---|---|
| 0 | phenyl |
| 1 | phenyl |
| 2 | phenyl |
| 0, 1 or 2 | 2-biphenylyl |
| 0, 1 or 2 | 4-biphenylyl |
| 0, 1 or 2 | alpha-naphthyl and beta-naphthyl; |

(II) Where the aryl group is substituted, especially substituted phenyl, as in phenyl substituted with 1 or 2 lower alkyls or a phenoxy:

| | |
|---|---|
| 0, 1 or 2 | o-tolyl |
| 0, 1 or 2 | m-tolyl |
| 0, 1 or 2 | p-tolyl |
| 0, 1 or 2 | 2,6-dimethylphenyl |
| 0, 1 or 2 | 2-ethylphenyl |
| 0, 1 or 2 | 2-phenoxyphenyl |

Reference may be had to the above mentioned Pats. 3,393,202 and 3,399,214 for details of a suitable way of making the chemicals.

above, and the plants were kept in a greenhouse environment at 75° F., 50% relative humidity.

A preferred chemical in which n is zero, R' is hydrogen, and R is 2-biphenylyl is called 5,6-dihydro-2-methyl-N-(2-biphenylyl)-1,4-oxathiin-3-carboxamide, and may be prepared as follows:

Preparation of 5,6-dihydro-2-methyl-N-(2-biphenylyl)-1,4-oxathiin-3-carboxamide

*Method A.*—To a suspension of 3-carboxy-5,6-dihydro-2-methyl-1,4-oxathiin (40 g. or .25 mole) in chloroform (200 ml.) was added thionyl chloride (35 g.) and the reaction mixture was heated under gentle reflux until solution resulted (2 hours). The excess thionyl chloride and solvent were removed in vacuo. The residue was dissolved in chloroform (200 ml.), triethylamine (30 g.) was added with cooling followed by a solution of 2-aminobiphenyl (42 g. or .25 mole) in chloorform (200 ml.). The reaction mixture was warmed for a few minutes, washed with water, the solvent removed and the residue crystallized from methanol, M.P. 83–86; yield, 47 g. or 60%.

*Method B.*—To a stirred solution of o-phenylacetoacetanilide (63 g. or .25 mole) in dry benzene (400 ml.) was added dropwise sulfuryl chloride (35 g.) in benzene (50 ml.) over one hour. The reaction mixture was stirred for an additional hour and the solvent was removed in vacuo. The residual alpha-chloro-o-phenylacetoacetanilide was dissolved in benzene (300 ml.), 2-mercaptoethanol (20 g. or .25 mole) was added, followed by a solution of sodium bicarbonate (30 g.) in water (250 ml.). The reaction mixture was stirred vigorously for two hours. The benzene layer was separated, acidified with p-toluenesulfonic acid (ca. 1 g.) and heated under reflux with water removal in a Dean-Stark trap (4.4 ml. of water was collected in 2 hours). The cooled benzene solution was washed with cold water, the solvent removed in vacuo and the residue crystallized from methanol. The yield of 5,6-dihydro-2-methyl-N-(2-biphenylyl) - 1,4 - oxathiin-3-carboxamide was 42 g. or 53%.

EXAMPLE 1

This example illustrates control of a virus disease by (1) chemical application to soil as a protective measure before the virus disease is introduced; (2) by chemical application to foilage after the virus disease is established in order to eradicate or reduce the disease severity of an established disease.

Virus inoculation.—Tobacco ring spot virus

Eight to ten day old cowpea plants, of a local lesion indicator strain, growing in 12 ounce styrofoam cups under greenhouse conditions, were inoculated with a tobacco ringspot virus preparation containing silicon carbide (.04 g./ml.) for minute wounding to introduce the virus into the cotyledonary leaves. The virus preparation used was obtained by extracting 200 ml. of virus infected tobacco tissue in 200 ml. of distilled water.

The cotyledonary leaves were inoculated with a T-bar inoculator using one stroke per leaf.

(1) Soil treatments prior to inoculation

For soil application tests the chemical treatment was applied to cowpea test plants ten days after planting by drenching the chemical into the soil through holes made in the soil surface by a glass rod, permitting the chemical to disperse evenly through the soil.

The chemicals were applied as soil drenches, using various quantities of a 500 p.p.m. solution in a standard 38 ml. aliquot to provide dosages of 5, 10, 25 or 50 p.p.m. by weight of soil to be treated. The 500 p.p.m. solutions were prepared by dissolving 150 mg. of the chemical to be tested in 5 ml. acetone, adding an emulsifier (EL719 Emulphor [polyoxyethylated vegetable oil], General Aniline & Film Corp.) and suspending the mixture in 300 ml. of distilled water.

The cotyledonary leaves were inoculated with the virus two days after treatment by the procedure described In four to six days local lesions appeared and the effectiveness of the chemical in controlling the disease was based on the reduction in numbers of local lesions (infection sites) per square inch of leaf surface, as compared to untreated controls. Since tobacco ringspot virus eventually becomes systemic in these cowpea plants, the influence of the chemical on disease development may be evaluated according to the delay of systemic disease development. In this example, untreated plants were killed within 5–7 days after inoculation. The treated plants were examined two weeks after inoculation and the number of plants surviving was recorded.

Data appears in Table I.

TABLE I

The virus disease inhibitor effect of oxathiin chemicals as measured by their ability to reduce the severity of tobacco ringspot virus disease, when applied as soil drenches prior to inoculation.

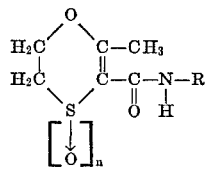

| n | R | P.p.m. | Percent control | Percent survival |
|---|---|---|---|---|
| 0 | phenyl | 35 | 30 | |
| 2 | phenyl | 35 | 35 | |
| 2 | o-tolyl | 35 | 48 | 66 |
| 0 | m-tolyl | 35 | 52 | 25 |
| 2 | m-tolyl | 35 | | 100 |
| 0 | 2,6-dimethylphenyl | 35 | 65 | 100 |
| 0 | 2-ethylphenyl | 35 | 44 | 66 |
| 0 | 2-phenoxylphenyl | 35 | 26 | 30 |
| 0 | 2-biphenylyl | 25 | 33 | 50 |

(2) Foliar treatment after inoculation

Plants were held 2–3 hours after inoculation to allow wound healing before application of test chemicals and to avoid surface inactivation of the virus.

The test chemicals, indicated in Table II, were sprayed on cotyledonary leaves (2000 p.p.m.) to the runoff point.

The chemicals used were formulated as aqueous suspensions by dissolving .2 g. chemical in 2 ml. acetone (2% by volume of water) and suspending the solution in water by adding one drop of Triton X-100 emulsifier (octyl phenoxy polyethoxy ethanol).

After spraying the plants were kept in a greenhouse environment at 75° F., 50% relative humidity. In four to six days local lesions appeared and the effectiveness of the chemical in controlling the disease was evaluated as described earlier.

Data appears in Table II.

TABLE II

The virus disease inhibitor effect of oxathiin chemicals as measured by their ability to reduce the severity of tobacco ringspot virus disease, when applied as foilage sprays.

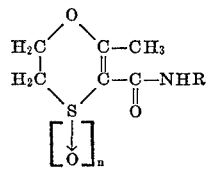

| n | R | Dosage | Percent control | Percent survival at 2 weeks |
|---|---|---|---|---|
| 2 | phenyl | 2,000 | 15 | 25 |
| 2 | o-tolyl | 2,000 | 25 | 25 |
| 0 | m-tolyl | 2,000 | 40 | 0 |
| 0 | 2-biphenylyl | 2,000 | 15 | 100 |

From Tables I and II various oxathiin chemicals applied as foliar sprays or soil drenches to tobacco ringspot virus-infected plants, reduced the number of active infection sites and delayed the systemic development of tobacco ringspot virus disease. Under severe test conditions of which the untreated plants were killed within 5 to 7 days, several chemical treatments resulted in 50% to 100% survival 2–3 weeks after infection. For example, the 2-biphenylyl chemical, applied as a 25 p.p.m. soil drench, resulted in 50% survival at two weeks after infection and a 2000 p.p.m. foliar spray treatment of infected plants resulted in 100% survival at two weeks.

EXAMPLE II

This example illustrates control of southern bean mosaic virus by (1) chemical application to soil as a protective measure before the virus is introduced to the plant; (2) by chemical application to foliage after the virus disease is established, in order to eradicate or reduce the disease severity.

Virus inoculation.—Southern bean mosaic virus

Eight to 10 day old pinto bean plants grown in 12 oz. styrofoam cups were used as local lesion test plants. Virus inoculum was prapared by extracting standard amounts of bean tissue using a chloroform - butanol - buffer system. Cotyledonary leaves were inoculated with the virus preparation containing .01 g./ml. silicon carbide for minute wounding, by using a glass T-bar inoculator.

Chemical treatment

Chemicals were applied as described above. In 3–5 days after inoculation local lesion infection sites appeared and the effectiveness of the chemical treatment was judged by the reduction in numbers of local lesion infection sites compared to the untreated control plants.

Data is shown in Table III.

TABLE III

The virus disease inhibitor effect of oxathiin chemicals as measured by their ability to reduce the severity of southern bean mosaic virus disease when applied as foliage sprays or soil drenches.

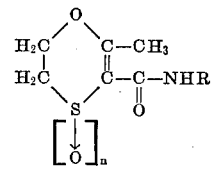

(A) SOIL DRENCH TREATMENTS (PRE-INOCULATION)

| n | R | P.p.m. | Percent control |
|---|---|---|---|
| 0 | phenyl | 35 | 82 |
| 1 | phenyl | 35 | 57 |
| 2 | phenyl | 35 | 46 |
| 2 | o-tolyl | 35 | 29 |
| 2 | 4-p-tolyl | 35 | 29 |
| 0 | 2-biphenylyl | 35 | 29 |

(B) FOLIAGE SPRAY TREATMENTS (POST INOCULATION)

| n | R | P.p.m. | Percent control |
|---|---|---|---|
| 0 | m-tolyl | 2,000 | 52 |
| 2 | p-tolyl | 2,000 | 43 |
| 0 | 2,6-dimethylphenyl | 2,000 | 29 |
| 0 | 2-ethylphenyl | 2,000 | 52 |
| 0 | 4-biphenylyl | 2,000 | 57 |
| 0 | alpha-naphthyl | 2,000 | 29 |

From Table III it may be seen that the chemicals of the invention reduced the number of Southern Bean Mosaic virus infections or local lesions on Pinto beans when applied to virus-infected plants as foliar sprays or soil drenches. The dosage selected demonstrates comparative activity and is not necessarily the most effective dosage for each chemical.

Having thus described our invention, what we claim and desire to protect by Letters Patent is:

1. A method of controlling mosaic or ringspot virus diseases of plant life comprising applying to the plant life infected with said virus a compound of the formula

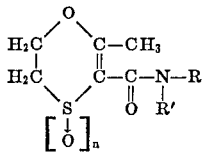

wherein:
R is selected from the group consisting of phenyl, biphenyl, naphthyl, phenyl substituted with 1 or 2 lower alkyl groups, and phenoxyphenyl;
R' is hydrogen; and
$n$ is zero, 1 or 2;
the said compounds being applied to said infected plant life in amount effective to control said virus.

2. A method as in claim 1, in which the said compound is selected from the group consisting of
5,6-dihydro-2-methyl-1,4-oxathiin-3-carboxanilide,
5,6-dihydro - 2 - methyl-N-(2-biphenyl)-1,4-oxathiin-3-carboxamide,
5,6-dihydro-2-methyl - N - (4-biphenyl) - 1,4 - oxathiin-3-carboxamide,
5,6-dihydro-2-methyl-N-(alpha-naphthyl) - 1,4 - oxathiin-3-carboxamide,
5,6-dihydro-2-methyl - N - (beta-naphthyl)-1,4-oxathiin-3-carboxamide,
5,6-dihydro - 2 - methyl-N-(o-tolyl) - 1,4 - oxathiin-3-carboxamide,
5,6-dihydro-2-methyl - N - (m-tolyl) - 1,4 - oxathiin-3-carboxamide,
5,6-dihydro - 2 - methyl - N - (p-tolyl)-1,4-oxathiin-3-carboxamide,
5,6-dihydro - 2 - methyl - N - (2,6-dimethylphenyl)-1,4-oxathiin-3-carboxamide,
N-(2-ethylphenyl) - 5,6 - dihydro-2-methyl-1,4-oxathiin-3-carboxamide, and
2,3-dihydro - 2 - methyl - N - (2-phenoxyphenyl)-1,4-oxathin-3-carboxamide, and the 4-oxides and 4,4-dioxides thereof.

3. A method as in claim 1, in which the said compound is selected from the group consisting of
5,6-dihydro - 2 - methyl - N - (2-biphenylyl)-1,4-oxathiin-3-carboxamide,
5,6-dihydro - 2 - methyl - N - (m-tolyl)-1,4-oxathiin-3-carboxamide-4,4-dioxide, and
5,6-dihydro - 2 - methyl - N - (2,6-dimethylphenyl)-1,4-oxathiin-3-carboxamide.

4. A method as in claim 1, in which the said compound is applied in aqueous suspension containing a surface-active dispersing agent, to infected plants.

5. A method as in claim 4, in which the compound is 5,6-dihydro-2-methyl-N-(2-biphenyl) - 1,4 - oxathiin-3-carboxamide.

6. A method as in claim 1, in which the said compound is applied in aqueous suspension containing a surface-active dispersing agent, by spraying said suspension onto the leaves of the plants to be treated.

7. A method as in claim 6, in which the compound is 5,6-dihydro - 2 - methyl-N-(2-biphenylyl)-1,4-oxathiin-3-carboxamide.

References Cited
UNITED STATES PATENTS

| | | | |
|---|---|---|---|
| 3,249,499 | 5/1966 | Schmeling et al. | 424—276 |
| 3,393,202 | 7/1968 | Kulka et al. | 260—327 P |
| 3,399,214 | 8/1968 | Kulka et al. | 260—327 P |
| 3,402,241 | 9/1968 | Schmeling et al. | 424—276 |
| 3,454,391 | 7/1969 | Schmeling et al. | 260—327 P |

JEROME D. GOLDBERG, Primary Examiner